Patented Apr. 22, 1924.

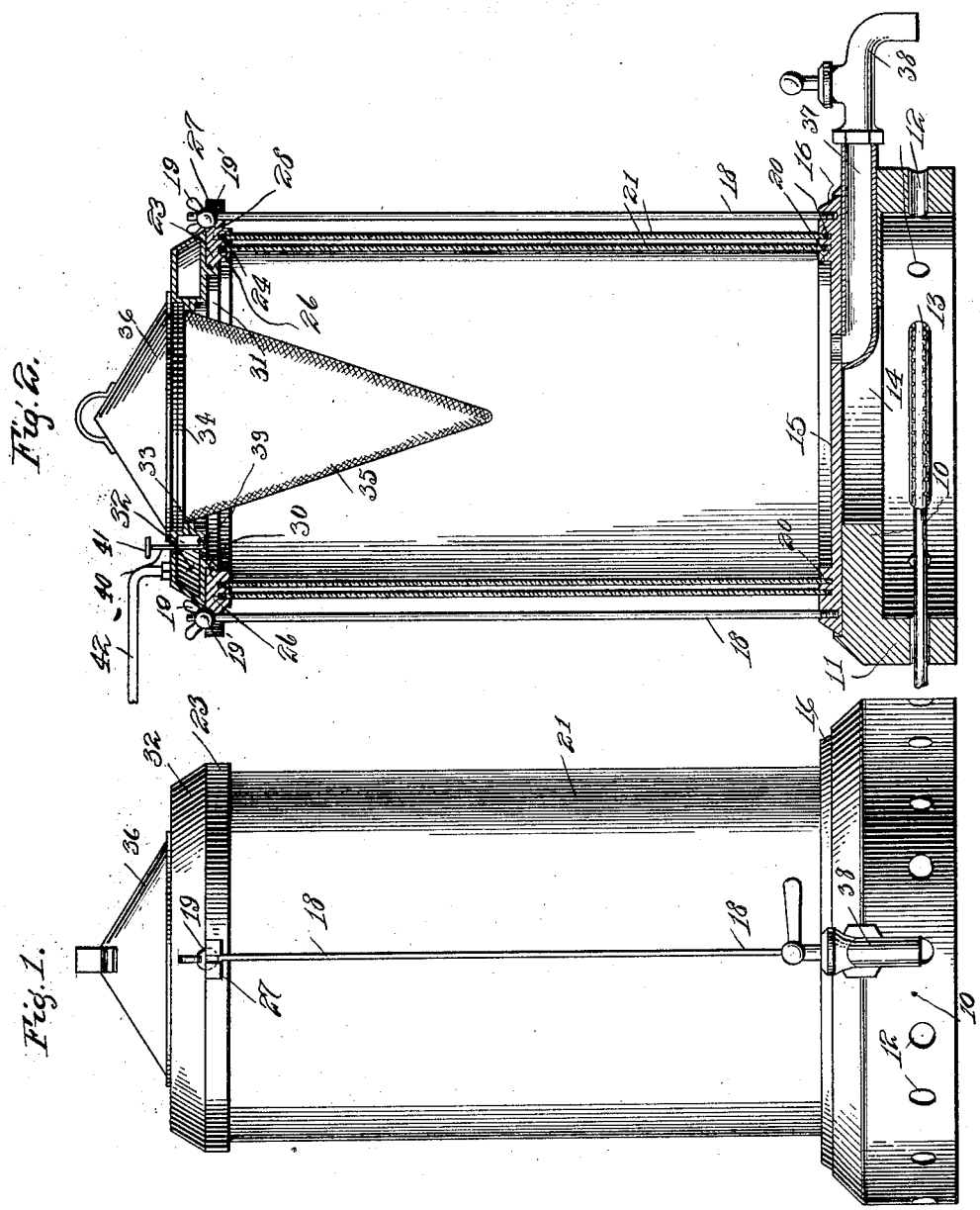

1,491,196

UNITED STATES PATENT OFFICE.

WILLIAM D. CANNONE AND HERMAN BLANK, OF CANEY, KANSAS.

COFFEE URN.

Application filed February 24, 1923. Serial No. 621,016.

*To all whom it may concern:*

Be it known that we, WILLIAM D. CANNONE and HERMAN BLANK, citizens of the United States, residing at Caney, in the county of Montgomery, State of Kansas, have invented certain new and useful Improvements in Coffee Urns; and we do hereby declare the following to be a full, clear, and exact description of the invention, such as will enable others skilled in the art to which it appertains to make and use the same.

This invention relates to new and useful improvements in cooking vessels, and particularly to vessels especially adapted for use in making coffee.

One object of the invention is to provide a device of this character which is simple in construction, formed from few parts, and which can be easily taken apart for cleaning or repairs.

Another object is to provide a device of this character which is transparent so that the contents may be seen, and the color readily observed, the walls having a dead air space therebetween.

Another object is to provide a device of this character wherein a reservoir of water is carried by the upper end from which to supply the interior of the device, from time to time, as necessary, said reservoir being so arranged that the water therein will be maintained at a high temperature thereby permitting the introduction of heated water to the already heated liquid in the main body of the device.

Other objects and advantages will be apparent from the following description when taken in connection with the accompanying drawing.

In the drawing:

Figure 1 is an elevation of a coffee urn made in accordance with the invention.

Figure 2 is a vertical sectional view through the urn, showing the manner of clamping the glass cylinder walls in place.

Referring particularly to the accompanying drawing, 10 represents a base which rests on the flange 11, said flange having a plurality of openings 12 to permit escape of the products of combustion from the burner 13 disposed beneath the base. The center of the base is formed with a large opening 14, and resting on the base, over the opening 14, is the bottom plate of the urn body. The peripheral edge of this plate 15, of the urn body, is beveled, as shown at 16, and is maintained in proper position on the base 10 by means of the circular shoulder 17, formed on said base. Secured in the peripheral edge portion of the plate 15 are the upwardly extending rods 18, each having its upper end threaded and carrying a winged nut 19, said nut having its lower portion rounded, as at 19', for a purpose which will presently appear. Formed in the upper face of the plate 15, adjacent its peripheral edge, are the concentric grooves 20 in which are seated the lower ends of the concentric and spaced cylindrical glass walls 21. Asbestos packing rings 22 are disposed in the grooves 20, to maintain liquid-tight joints between the glass cylinders and the bottom plate 15. A metal ring 23 is disposed on the upper ends of the glass cylinders and is formed with the grooves 24, in its lower face, around the central opening 25, to receive the packing rings 26 and the upper ends of the said cylinders, whereby said cylinders are held in proper spaced relation, and a dead air space maintained therebetween. In the peripheral edge of the ring 23 are formed the bifurcated lugs 27 which receive the upper ends of the before-mentioned rods 18, the inner end of each of the bifurcations being formed with a concavity 28 to receive the rounded lower portion of the winged nut 19, and whereby the nut and rod are maintained in proper clamping position. Formed on the face of the wall of the central opening 25 of the ring 23 is an inwardly extending flange 30 which is threaded to receive the externally threaded depending flange 31 formed on the bottom of the ring-shaped tank 32, which is seated on the ring 23. This tank 32 is adapted to contain a supply of water from which to replenish the interior of the urn, from time to time, as is found necessary. Resting on a ledge 33, formed on the inner face of the tank 32 is a ring 34, from which depends a coffee bag 35, and seated within the upper portion of the central opening of the tank is a removable cover 36. The peripheral edge of the tank 32 is beveled to improve the appearance of the urn.

From the lower face of the plate 15 there extends an outlet pipe 37, the same having a faucet 38 on its outer end, for the purpose of drawing off quantities of coffee from the urn.

In the bottom of the tank 32 there is formed a valve seat 39 to receive the pointed end of the needle valve 40, the stem of said valve extending upwardly through the tank and being provided with a suitable handle 41. By means of this needle valve 40 water may be permitted to pass from the tank into the main body of the urn. Connected to the upper wall of the tank 32 is a pipe 42 by means of which water may be supplied to the tank from any suitable source.

The heat from the burner will pass upwardly through the opening in the base 10 and against the bottom plate 15 to cause the boiling of the liquid in the inner glass cylinder, which boiling liquid will draw from the coffee in the bag 35, thus producing the desired concoction. The progress of the making of the coffee can be noted by inspection through the glass cylinders, and should the operator desire he may cause more water to flow into the cylinder, from the tank 32.

The position of the tank 32 is such that the water therein will be heated, and maintained in a heated condition, whereby the additional supply of water will be hot, when discharged into the cylinder, and the temperature of the concoction unaffected.

By loosening the winged nuts 19, the urn may be taken apart and necessary cleaning or repairs made.

What is claimed is:

1. A coffee urn comprising concentric and spaced transparent walls, end members clamped to the transparent walls, a coffee container within the upper end of the urn, a water reservoir on the upper end of the urn for supplying water to the interior of the urn, and means on the water reservoir for suspending the coffee container.

2. A coffee urn comprising transparent walls, end clamping plates having grooves receiving the ends of the transparent walls, a ring-shaped tank removably engaged within the upper of said clamping plates, means in said tank for supporting a coffee container, a cover for closing the opening in the tank and retaining the coffee container in position, and means for discharging from the tank into the interior of the transparent walls.

3. A coffee urn comprising a main container body consisting of parallel spaced cylindrical transparent walls, a bottom plate having grooves receiving the lower ends of said walls, a grooved ring on the upper ends of the said walls, clamping rods extending between the bottom plate and said ring, a ring-shaped tank having a depending flange removably engaged within the central opening of said ring, a coffee container supported within the central opening of the ring-shaped tank, a liquid conduit connected with the ring-shaped tank, and a valve in said tank in position to discharge into the interior of the container body.

4. In a coffee urn, the combination with a main container body, of a tank mounted on the body in position to discharge into the interior of the body and having a central opening therethrough, means for supplying the tank, a coffee container suspended within said opening, and a cover seated on the tank and covering the container and opening.

In testimony whereof, we affix our signatures, in the presence of two witnesses.

WILLIAM D. CANNONE.
HERMAN BLANK.

Witnesses:
J. W. ERNEST,
LEROY RUNYON.